Patented May 28, 1935

2,002,800

UNITED STATES PATENT OFFICE 2,002,800

PLASTIC MATERIALS

Walther Schrauth, Berlin-Dahlem, Germany, assignor to Deutsche Hydrierwerke Aktiengesellschaft, Berlin-Charlottenburg, Germany, a corporation of Germany No Drawing. Application May 7, 1932, Serial No. 609,993. In Germany March 28, 1931

3 Claims. (Cl. 106—37)

The present invention relates to plastic masses including elastic and flexible films, lacquers, materials adapted to be moulded and cured and the like.

The principal object of the invention is to provide an improved plasticizing, gelatinizing or softening material to be added to plastic materials of various types.

Another object is to provide an improved softening material for cellulose derivatives.

A further object is to provide a material of the type which can be manufactured effectively and economically. The invention finds perhaps its greatest utility as applied to lacquers, varnishes and the like and adds materially to the elasticity and flexibility of the lacquer or varnish in use. The invention is also applied advantageously to plastic masses of the type which are moulded or which are applied with a trowel and cured. Such compositions may for example contain nitro-cellulose or resins of either the natural or synthetic type including those obtained from turpentine and various natural gums.

The gelatinizing and softening materials of the invention are esters of polybasic organic acids and alcohols including the alcohols of higher molecular weight. These esters are sufficiently non-volatile to provide a lasting effect and they soften plastic masses including lacquers, mouldable materials and the like, particularly cellulose derivatives, and prevent them from becoming hard and brittle.

The softening or gelatinizing agents to be more particularly described for the purposes of illustration consist of esters of dibasic acids and primary mono-hydric alcohols obtained from the natural fats and waxes of both animal and vegetable origin. The acids may be of the aliphatic, cyclic or hydro-cyclic groups with or without hydroxyl groups. From a commercial point of view the most practical of these acids are probably the oxalic, succinic, adipic, sebacic, tartaric, phthalic, hydrophthalic and diacetic-cyclo-hexanol, but it will be understood that these acids are representative of a larger group. The esters are formed by esterifying with one or more primary mono-hydric aliphatic alcohols, and at least one carboxyl group is esterified by an alcohol having 8 or more carbon atoms in the molecule. There are certain advantages in esterifying the other carboxyl group or groups with an alcohol having less than 8 carbon atoms. The alcohols which are commercially practical are those containing 1 to 4 carbon atoms. Of the higher molecular alcohols those obtained from the animal and vegetable fats and especially those containing from 12 to 18 carbon atoms are probably the most practicable commercially, and these may be either saturated or unsaturated.

The esters obtained as above indicated are partly viscous liquids, partly solids. They are easily combined with solvents generally used in the industry. They form stable solutions with cellulose esters and ethers, with nitro-cellulose, resins, fats, oils and the like from which they do not volatilize. These esters may be used alone or in combination with other agents or solvents. The amount of the softening agent to be added to a plastic material such as lacquer or varnish compositions will depend upon the constituents and the degree of flexibility and elasticity required. By the addition of large quantities of filler material, plastic products of great adhesive and enduring elastic properties which may readily be applied with a trowel are produced.

The esters may be produced by heating the acids with the required equivalent of the alcohols. The temperature of the reaction may be carried to about 250° C., but may vary considerably. If the compound ester of an acid with both a higher molecular and a lower molecular alcohol is to be produced, the acid is first heated with the calculated quantity of the lower molecular alcohol to form an acid ester and then this acid ester is heated with the calculated quantity of the higher molecular alcohol. The reaction is facilitated by using the acid anhydrides or by using a dehydrating catalyst such for instance as boric acid or anhydrous phosphoric acid ($P_2O_5$), or by adding a solvent which when volatilized will carry off the water vapor formed by the esterification.

The esters may also be produced by re-esterifying dibasic acid esters of lower order with alcohols of higher molecular weight.

The esters used are preferably those in which both or all of the carboxyl group are esterified as distinguished from acid esters in which one or more of the carboxyl groups are not disturbed. Whether the acids are completely esterified with one alcohol or with two or more will depend upon the particular characteristics desired. Alcohols of lower molecular weight and unsaturated alcohols tend to give greater fluidity. Alcohols of higher molecular weight reduce the volatility and therefore effect enduring elasticity and flexibility.

*Example 1.*—100 parts by weight of collodion fibers and 20 parts of any resin are dissolved in a mixture of 400 parts of butyl acetate, 100 parts of butyl alcohol and 350 parts of benzol. To this entire mixture, are added 50 parts of a phthalic acid ester, obtained by esterifying phthalic acid anhydride with lauryl alcohol. The lacquer obtained in this way produces coverings and films of great adhesion and long-lasting great elasticity. Instead of the esters employed here, the lauric esters of other dibasic acids, such as for instance succinic acid, adipic acid, sebacic acid and others, hydrophthalic acid, hexahydrophenylenediacetic acid and so on may also be used. The acids mentioned may also be esterified with other alcohols, for instance cetyl alcohol, as produced from spermaceti in additional to lauryl alcohol. It is likewise possible to esterify one half of the acids mentioned with alcohol of lower molecular weight, for instance with methyl, ethyl, propyl, or butyl alcohol and to link only one of the carboxyl groups to an alcohol of higher molecular weight. In this case the volatility of the novel softening means is advanced somewhat, being desirable for many purposes.

*Example 2.*—A trowel substance of long-lasting elasticity, firmly adhesive to surfaces of all kinds, is obtained if 10 parts of an ester, produced by esterifying adipic acid with any alcohol obtained by high pressure reduction of vegetable or animal fats, are added to 15 parts of a cellulose ester, 8 parts of dammar resin, 12 parts of butyl alcohol, 30 parts of butyl acetate, 15 parts of toluol, and 10 parts of ethyl alcohol and the solution obtained is mixed with an adequate quantity of filling material such as lithopone or milled slate.

*Example 3.*—If an ester, produced by esterifying hydrophthalic acid with an equimolecular mixture of butyl and oleyl alcohol, is added to a solution of acetyl cellulose in the presence of benzyl alcohol, a product is obtained which is adapted to the manufacture of transparent wireglass windows.

The foregoing particular description is illustrative merely and is not intended as defining the limits of the invention.

I claim:

1. A composition of matter comprising the mixture with a plastic material of a plasticizing and softening agent comprising a mixed ester of an acid of the group consisting of aliphatic, cyclic and hydrocyclic diabasic acids with both an alcohol of the group consisting of methyl, ethyl, propyl and butyl alcohols and a saturated alcohol of the group obtained by hydrogenation of the natural fats and waxes and having 16 or more carbon atoms in the molecule.

2. A composition of matter comprising the mixture with a plastic material of a plasticizing and softening agent comprising a mixed ester of an acid of the group consisting of aliphatic, cyclic and hydrocyclic diabasic acids with both an alcohol of the group consisting of methyl, ethyl, propyl and butyl alcohols and a primary saturated aliphatic alcohol having 16 to 18 carbon atoms in the molecule.

3. A plasticizing and softening agent for plastic masses comprising a mixed ester of a dibasic aliphatic acid with one primary monohydric saturated alcohol having less than 8 carbon atoms in the molecule and another primary monohydric saturated alcohol having 16 or more carbon atoms in the molecule.

WALTHER SCHRAUTH.